United States Patent
Brundage et al.

(10) Patent No.: US 7,152,786 B2
(45) Date of Patent: Dec. 26, 2006

(54) IDENTIFICATION DOCUMENT INCLUDING EMBEDDED DATA

(75) Inventors: Trent J. Brundage, Tigard, OR (US); Brett T. Hannigan, Menlo Park, CA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 10/830,975

(22) Filed: Apr. 22, 2004

(65) Prior Publication Data

US 2005/0067487 A1    Mar. 31, 2005

Related U.S. Application Data

(63) Continuation of application No. 10/094,593, filed on Mar. 6, 2002, now abandoned.

(60) Provisional application No. 60/356,881, filed on Feb. 12, 2002.

(51) Int. Cl.
*G06K 5/00* (2006.01)
*H04K 1/00* (2006.01)

(52) U.S. Cl. .................. 235/380; 713/186; 235/454

(58) Field of Classification Search .......... 235/375, 235/435, 380–382.5, 439, 440, 454, 494; 382/115, 118; 713/186
See application file for complete search history.

(56) References Cited

U.S. PATENT DOCUMENTS

| | | | |
|---|---|---|---|
| 4,359,633 A | 11/1982 | Bianco | |
| 4,590,366 A | 5/1986 | Rothfjell | |
| 4,663,518 A | 5/1987 | Borror et al. | |
| 4,675,746 A | 6/1987 | Tetrick et al. | |
| 4,689,477 A | 8/1987 | Goldman | |
| 4,790,566 A | 12/1988 | Boissier et al. | |
| 4,879,747 A | 11/1989 | Leighton et al. | |
| 4,972,476 A | 11/1990 | Nathans | |
| 4,994,831 A | 2/1991 | Marandi | |
| 5,113,445 A | 5/1992 | Wang | |
| 5,237,164 A | 8/1993 | Takada | |
| 5,284,364 A | 2/1994 | Jain | |
| 5,319,453 A | 6/1994 | Copriviza et al. | |
| 5,321,751 A | 6/1994 | Ray et al. | |
| 5,337,361 A | 8/1994 | Wang et al. | |
| 5,351,302 A | 9/1994 | Leighton | |
| 5,379,345 A | 1/1995 | Greenberg | |
| 5,384,846 A | 1/1995 | Berson et al. | |
| 5,396,559 A | 3/1995 | McGrew | |
| 5,436,970 A | 7/1995 | Ray et al. | |
| 5,469,506 A * | 11/1995 | Berson et al. ............ 713/186 |

(Continued)

FOREIGN PATENT DOCUMENTS

DE        29 43 436        5/1981

(Continued)

OTHER PUBLICATIONS

"Best Practices for the Use of Magnetic Stripes," MVIS Magnetic Stripe Working Group, Report to AAMVA, Version 2.0, Apr. 1996, including a history on p. 3.

(Continued)

*Primary Examiner*—Ahshik Kim
*Assistant Examiner*—Jamara A. Franklin
(74) *Attorney, Agent, or Firm*—Digimarc Corporation

(57) ABSTRACT

The present invention provides methods and systems to authenticate identification documents. In a first implementation, an identification document includes a photograph and a digital watermark. The digital watermark carries first facial recognition data corresponding to a face depicted in the photograph. Optical scan data representing the photograph is received, and a second facial recognition data is derived. The first facial recognition data is recovered from the digital watermark, and is compared with the second facial recognition data.

21 Claims, 4 Drawing Sheets

U.S. PATENT DOCUMENTS

| | | | |
|---|---|---|---|
| 5,471,533 A | 11/1995 | Wang et al. | |
| 5,488,664 A | 1/1996 | Shamir | |
| 5,490,217 A | 2/1996 | Wang et al. | |
| 5,505,494 A | 4/1996 | Belluci et al. | |
| 5,635,012 A | 6/1997 | Belluci et al. | |
| 5,636,292 A | 6/1997 | Rhoads | |
| 5,646,997 A | 7/1997 | Barton | |
| 5,652,626 A | 7/1997 | Kawakami et al. | |
| 5,659,726 A | 8/1997 | Sandford, II et al. | |
| 5,694,471 A | 12/1997 | Chen et al. | |
| 5,710,834 A | 1/1998 | Rhoads | |
| 5,721,788 A | 2/1998 | Powell et al. | |
| 5,742,685 A * | 4/1998 | Berson et al. | 713/186 |
| 5,748,783 A | 5/1998 | Rhoads | |
| 5,760,386 A | 6/1998 | Ward | |
| 5,767,496 A | 6/1998 | Swartz | |
| 5,768,426 A | 6/1998 | Rhoads | |
| 5,786,587 A | 7/1998 | Colgate, Jr. | |
| 5,787,186 A * | 7/1998 | Schroeder | 382/115 |
| 5,799,092 A | 8/1998 | Kristol et al. | |
| 5,841,886 A | 11/1998 | Rhoads | |
| 5,864,622 A | 1/1999 | Marcus | |
| 5,864,623 A | 1/1999 | Messina | |
| 5,907,149 A | 5/1999 | Marckini | |
| 5,912,974 A | 6/1999 | Holloway et al. | |
| 5,984,366 A | 11/1999 | Priddy | |
| 6,024,287 A | 2/2000 | Takai et al. | |
| 6,243,480 B1 | 6/2001 | Zhao et al. | |
| 6,249,226 B1 | 6/2001 | Harrison | |
| 6,286,761 B1 | 9/2001 | Wen | |
| 6,289,108 B1 | 9/2001 | Rhoads | |
| 6,292,092 B1 | 9/2001 | Chow et al. | |
| 6,321,981 B1 | 11/2001 | Ray et al. | |
| 6,343,138 B1 | 1/2002 | Rhoads | |
| 6,389,151 B1 | 5/2002 | Carr et al. | |
| 6,411,725 B1 * | 6/2002 | Rhoads | 382/100 |
| 6,424,249 B1 | 7/2002 | Houvener | |
| 6,430,306 B1 | 8/2002 | Slocum | |
| 6,430,307 B1 | 8/2002 | Souma et al. | |
| 6,463,416 B1 | 10/2002 | Messina | |
| 6,546,112 B1 | 4/2003 | Rhoads | |
| 6,553,494 B1 * | 4/2003 | Glass | 713/186 |
| 6,591,249 B1 * | 7/2003 | Zoka | 705/18 |
| 6,608,911 B1 | 8/2003 | Lofgren et al. | |
| 6,748,533 B1 * | 6/2004 | Wu et al. | 713/176 |
| 6,751,336 B1 | 6/2004 | Zhao et al. | |
| 6,782,116 B1 | 8/2004 | Zhao et al. | |
| 7,024,563 B1 * | 4/2006 | Shimosato et al. | 713/186 |
| 2002/0046171 A1 | 4/2002 | Hoshino | |
| 2002/0116508 A1 | 8/2002 | Khan et al. | |
| 2002/0136459 A1 | 9/2002 | Imagawa | |
| 2002/0150277 A1 | 10/2002 | Nishimoto | |
| 2003/0002710 A1 | 1/2003 | Rhoads | |
| 2003/0099379 A1 | 5/2003 | Monk et al. | |
| 2003/0102660 A1 | 6/2003 | Rhoads | |
| 2003/0126121 A1 | 7/2003 | Khan et al. | |

FOREIGN PATENT DOCUMENTS

| | | |
|---|---|---|
| EP | 629 972 | 12/1994 |
| EP | 0736860 | 10/1996 |
| EP | 642060 B1 | 4/1999 |
| JP | 3-185585 | 8/1991 |
| WO | WO9603286 | 2/1996 |

OTHER PUBLICATIONS

Chow et al., "Forgery and Tamper-Proof Identification Document," IEEE Proc. 1993 Int. Carnahan Conf. on Security Technology, Oct. 13-15, 1993, pp. 11-14.

Szepanski, "A Signal Theoretic Method For Creating Forgery-Proof Documents For Automatic Verification," 1979 Carnahan Conference on Crime Countermeasures, University of Kentucky, Lexington, Kentucky, May 16-18, 1979.

Kawaguchi et al., "Principle and Applications of BPCS-Steganography," Proc. SPIE vol. 3528: Multimedia Systems and Applications, Nov. 2-4, 1998, pp. 464-473.

Komatsu et al., "A Proposal on Digital Watermarking in Document Image Communication and Its Application to Realizing a Signature," Electronics and Communications in Japan, Part I, vol. 73, No. 5, 1990, pp. 22-33.

Komatsu et al., "Authentication System Using Concealed Image in Telematics," Memoirs of the School of Science & Engineering, Waseda Univ., No. 52, 1988, pp. 45-60.

Seybold Report on desktop Publishing, "Holographic Signatures for Digital Images," Aug. 1995, 1 page.

* cited by examiner

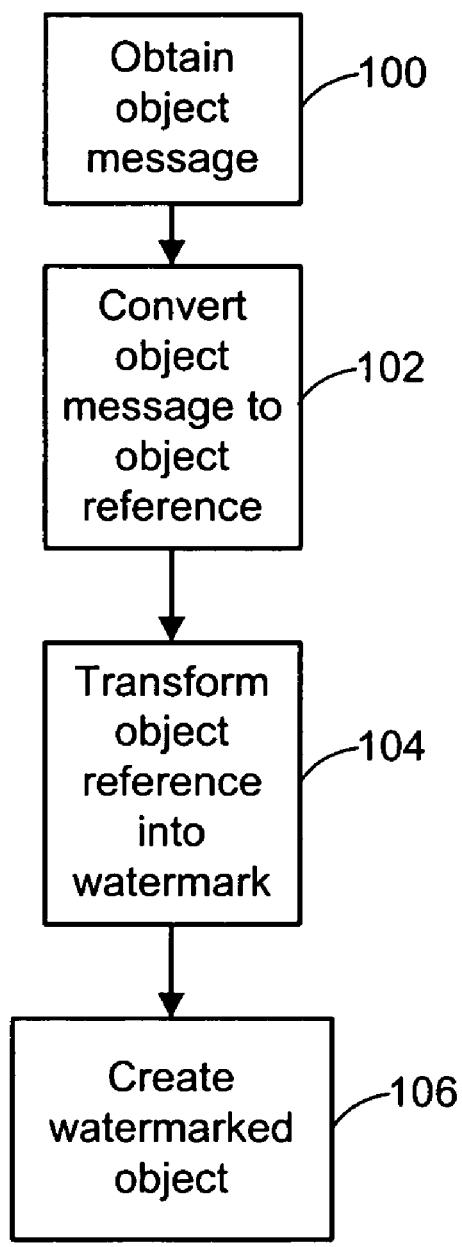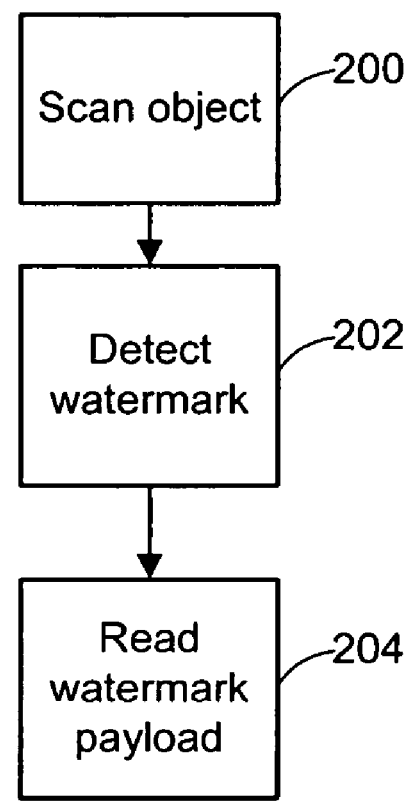

IDENTIFICATION DOCUMENT INCLUDING EMBEDDED DATA

RELATED APPLICATION DATA

The present application is a continuation of U.S. patent application Ser. No. 10/094,593 (published as U.S. 2002-0170966 A1), filed Mar. 6, 2002, now abandoned which claims the benefit of U.S. Provisional Patent Application No. 60/356,881 Feb. 12, 2002.

The present application is also related to assignee's U.S. patent application Ser. No. 09/452,021, which is a continuation-in-part of application Ser. No. 09/130,624 (now U.S. Pat. No. 6,324,573). The Ser. No. 09/130,624 application is a continuation of U.S. patent application Ser. No. 08/508,083 (now U.S. Pat. No. 5,841,978). This application is also related to the following U.S. patent application Ser. Nos. 09/292,569, 09/314,648 (now U.S. Pat. No. 6,681,028), Ser. Nos. 09/343,104, 09/452,023 (now U.S. Pat. No. 6,408,082), Ser. Nos. 09/452,022, 09/571,422 and 10/027,783 (published as U.S. 2002-0126872 A1). The technology disclosed in this application can advantageously be used in the methods and systems disclosed in the foregoing patent and applications.

Each of the above-mentioned patent documents is herein incorporated by reference.

TECHNICAL FIELD

The invention relates to digital watermarking and the cooperation of digital watermarking with other machine-readable codes such as barcodes.

BACKGROUND AND SUMMARY

There are a variety of standard ways to encode information in a machine-readable code that is either affixed to or applied to the surface of a tangible object. Perhaps the most widespread form of machine-readable code is the barcode, but there are many others. Other forms of machine-readable identification include magnetic stripe, magnetic ink character recognition (MICR), optical character recognition (OCR), optical mark recognition (OMR), radio frequency identification (RF/ID) etc.

While these forms of machine-readable identification are widely used and effective for many applications, they all have the disadvantage that they must occupy a dedicated portion of the physical object that they reside on. For example, if one wishes to apply a barcode or magnetic stripe to an object, the physical implementation of the code must occupy some portion of the object's surface apart from the other information content on the object. For some applications, this limitation does not pose a problem. For many applications, however, the need to locate the code on a dedicated portion of the object is a significant drawback. One drawback is that it requires the user to position the object so that the portion carrying the code can be read. Another drawback is that the code is not aesthetically pleasing, and may detract from the overall appearance of the object. In addition, the placement of the code may require an expensive and cumbersome manufacturing and application process.

Another characteristic of these forms of machine-readable identification is that they are perceptible to the users of the object. Again, for many applications, this characteristic is not a concern, and may in fact be a benefit. In some cases, however, it is a disadvantage for the code to be visually perceptible. As noted above, one drawback is that it detracts from the aesthetic appearance of the object. Another drawback is that it may be more likely to be tampered with.

In some applications, however, it may be advantageous to combine barcodes (or other machine-readable codes) and digital watermarks. Watermarks may be embedded in the information content (e.g., an image, photograph or graphics) or texture of an object's surface, and thus, do not require a separate, dedicated portion of the surface area. While some forms of image watermarks are visible, many others may be embedded such that they are virtually imperceptible to a user, yet readable by a machine.

In the following detailed description, watermarks and related machine-readable coding techniques are used to embed data within the information content on object surfaces. These techniques are used in combination with standard machine-readable coding methods such as bar codes, magnetic stripes, etc. As such, the coding techniques extend to many applications, such as linking documents together, identification card authentication, etc.

Further features and advantages will become even more apparent with reference to the following detailed description and accompanying drawings.

BRIEF DESCRIPTION OF THE DRAWINGS

FIG. 1 is a flow diagram illustrating an overview of a digital watermarking embedding process.

FIG. 2 is a flow diagram illustrating an overview of a digital watermark detecting process.

DETAILED DESCRIPTION

Overview of a Digital Watermark System

Figure 3:
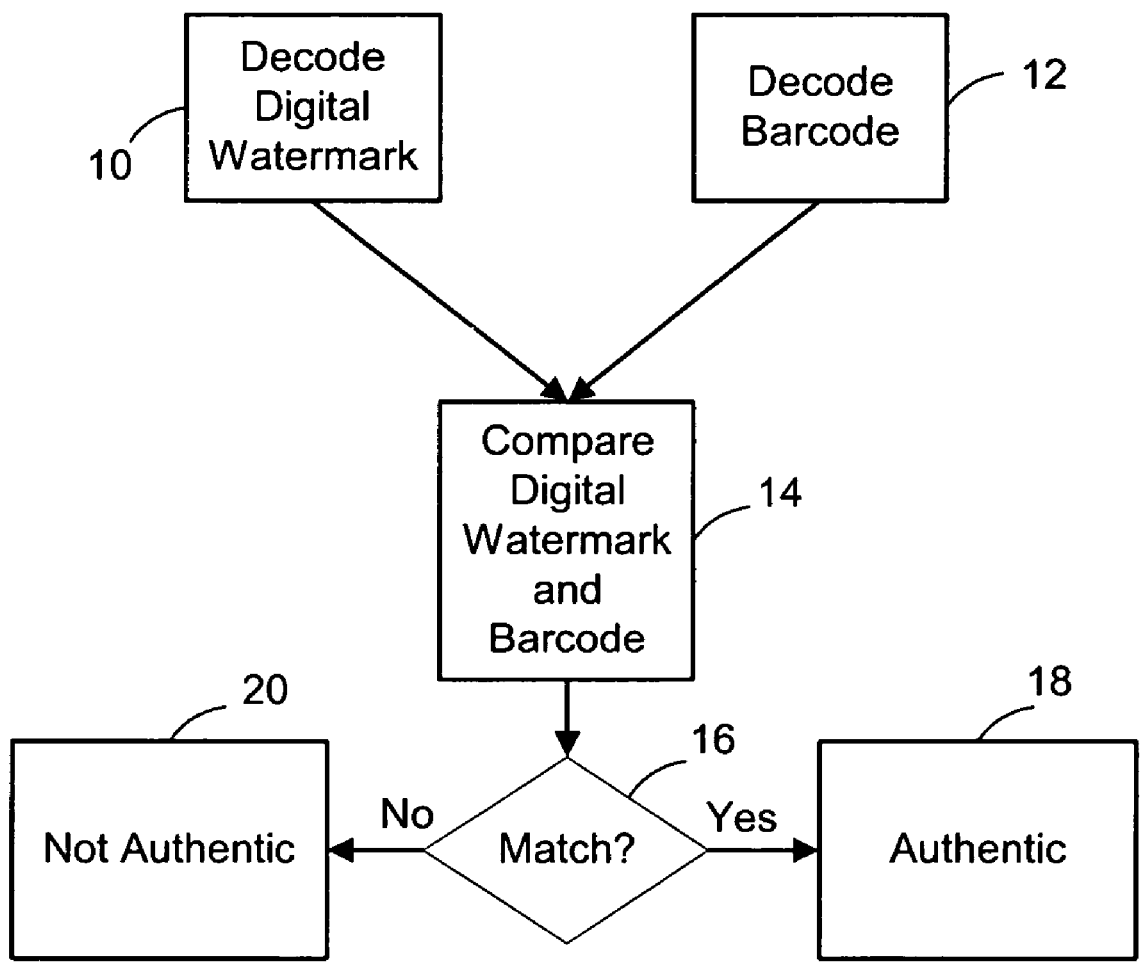
FIG. 3 is a flow diagram illustrating an overview of an authentication process.

The primary components of a watermarking system are an embedder and a reader. The embedder encodes information into a watermark and applies it to an object, while the reader detects the watermark and decodes its information content. FIG. 1 is a flow diagram illustrating an overview of an embedding process. While advantageous to perform automatically, some of the steps may be performed manually, and may be implemented in distinct system components.

The process begins by obtaining an object message (100). In this context, an object message is a general term referring to information associated with an object, including object identifiers, an index to other information or instructions, and machine instructions. For example, the message may be a product identifier such as a Universal Product Code (UPC). Or the message may include information that is also encoded on the object in other machine-readable code formats such as in a barcode. For many applications, it is advantageous to leverage an existing object messaging scheme such as a UPC symbology, a magnetic stripe coding format, or some other extrinsic standard. However, it is also possible to develop a customized messaging scheme tailored to meet the demands of a particular application.

Next, the object message is converted into an object reference (102). The objective of this stage is to place the message in a data format suitable for transforming into a watermark signal. In some instances, the message may already be in a data format that can be directly converted to a watermark information signal (e.g., a binary number). In this case, there is no need to transform the object message into a different data format. In other instances, the object message may be expressed as a numeric or alphanumeric string representing some coded format. In this case, the embedding process decodes and transforms the message into a form suitable for conversion to a watermark. This process may involve, for example, decoding and mapping each character or groups of adjacent characters into a binary number.

Next, the object reference is transformed into a watermark signal (104). The watermark signal defines how to manipulate the information content conveyed on the object's surface so as to place a watermark on the object. The specific details of this process depend on the nature of the watermark.

The watermark may be embedded in the information content of a digital image, for example. A digital image is comprised of a two or more dimensional array of image samples. In this case, the image sample values are manipulated to embed the watermark signal in the image. The term "image sample" refers generally to a discrete value in the image array. The image sample constitutes a value in any one of several domains, such as a spatial or frequency domain. In any given domain, image content may be represented in a variety of standard or custom formats or color spaces. A color space may have one or more dimensions. For example, a monochrome image typically has a single dimension representing a gray-scale value, while a color image typically has three dimensions, e.g., RGB (Red, Green, and Blue); or YUV (Luminance, and two Chrominance components).

While a digital watermark is typically applied to digital content, it may be implemented so as to remain with the content even through transformations to and from the analog domain. In addition to images, it applies to a variety of different media types, including audio and video.

The assignee's watermarking technology is reflected in U.S. patent application Ser. No. 09/503,881 (now U.S. Pat. No. 6,614,914), U.S. Pat. No. 5,862,260 and laid-open PCT Application WO97/43736 (corresponding to U.S. patent application Ser. No. 08/746,613). Of course, other digital watermarking embedding techniques can be employed with our present invention, particular when other techniques provide a digital watermark with information carrying capacity.

Another way to encode additional information in an image is in the form of a data glyph. An implementation of data glyphs is described in U.S. Pat. No. 5,315,098. Related visible watermarking work is illustrated in U.S. Pat. Nos. 5,706,364, 5,689,620, 5,684,885, 5,680,223, 5,668,636, 5,640,647 and 5,594,809.

Alternatively, the watermark may be embedded in line graphics or text by varying the position of lines or characters in a manner that encodes the object reference.

In summary, watermarking can be applied to myriad forms of information. These include imagery (including video) and audio—whether represented in digital form (e.g., an image comprised of pixels, digital video, etc.), or in an analog representation (e.g., non-sampled music, printed imagery, banknotes, etc.). Watermarking can be applied to digital content (e.g. imagery, audio) either before or after compression (MPEG2, MPEG4, MP3). Watermarking can also be used in various "description" or "synthesis" language representations of content, such as Structured Audio, Csound, NetSound, SNHC Audio and the like (c.f. http://sound.media.mit.edu/mpeg4/) by specifying synthesis commands that generate watermark data as well as the intended audio signal.

Watermarking can also be applied to ordinary media, whether or not it conveys information. Examples include paper, plastics, laminates, product labels and packaging, paper/film emulsions, etc. A watermark can embed a single bit of information, or any number of bits.

The physical manifestation of watermarked information most commonly takes the form of altered signal values, such as slightly changed pixel values, picture luminance, picture colors, DCT coefficients, instantaneous audio amplitudes, etc. However, a watermark can also be manifested in other ways, such as changes in the surface microtopology of a medium, localized chemical changes (e.g. in photographic emulsions), localized variations in optical density, localized changes in luminescence, etc. The surface texture of an object may be altered to create a watermark pattern. This may be accomplished by manufacturing an object in a manner that creates a textured surface or by applying material to the surface (e.g., an invisible film or ink) in a subsequent process. Watermarks can also be optically implemented in holograms and conventional paper watermarks.

When determining how to implement this aspect of the embedder, there are a number of design objectives to consider. One objective to consider is the degree to which the watermark is imperceptible upon ordinary inspection. As the watermark becomes less perceptible, it may also become more difficult to detect and read accurately. Another objective is the quantity of information that one wishes to embed in the watermark. As the quantity of information increases, the watermark will need to support larger object references. Yet another objective is security. In some applications, it is desirable to employ an object reference scheme that makes the object references more difficult to decipher or remove from the objects.

Having created a watermark signal, the embedder creates the watermarked object (106). As referenced above, this process may involve printing or applying a watermarked image to the surface of the object, or texturing the surface of the object so as to impart the watermark to the object.

Once embedded in the object, the object reference serves as a machine-readable code that conveys information about the object, a machine instruction or instructions, or an index to information or instructions. Any compatible reader may extract the object reference. FIG. 2 is a flow diagram illustrating an overview of the reading process. Typically, the reader system incorporates a combination of hardware and software elements. First, the reader scans the object surface to capture a digital representation of the surface (e.g., an image, or map of surface topology) (200). Next, the reader processes the surface representation to detect whether a watermark is present (202). If so, the reader proceeds to read the watermark payload (204). In some implementations, a separate detection process is not performed.

Bar Codes

Over the years, a number of standards organizations and private entities have formed symbology standards for bar codes. Some examples of standards bodies include the Uniform Code Council (UCC), European Article Numbering (EAN, also referred to as International Article Numbering Association), Japanese Article Numbering (JAN), Health Industry Bar Coding Counsel (HIBC), Automotive Industry Action Group (AIAG), Logistics Application of Automated Marking and Reading Symbols (LOGMARS), Automatic Identification Manufacturers (AIM), American National Standards Institute (ANSI), and International Standards Organization (ISO).

The UCC is responsible for the ubiquitous bar code standard called the Universal Product Code (UPC). AIM manages standards for industrial applications and publishes standards called Uniform Symbology Standards (USS).

Some well know bar code schemes include UPC and UCC/EAN-128, Codabar developed by Pitney Bowes Corporation, I 2 of 5 and Code 128 developed by Computer Identics, Code 39 (or 3 of 9) developed by Intermec Corporation, and code 93.

Some bar codes, such as UPC, are fixed length, while others are variable length. Some support only numbers, while others support alphanumeric strings (e.g., Code 39 supports full ASCII character set). Some incorporate error checking functionality.

While the bar codes listed above are generally one-dimensional in that they consist of a linear string of bars, bar codes may also be two-dimensional. Two dimensional bar codes may be in a stacked form (e.g., a vertical stacking of one-dimensional codes), a matrix form, a circular form, or some other two-dimensional pattern. Some examples of 2D barcodes include code 49, code 16k, Data Matrix developed by RVSI, Maxicode, QR code, micro PDF-417 and PDF-417. Of course, this is not an exhaustive list of 2-D barcodes. The present invention can be suitably utilized with other barcode symbologies. All of the above bar code schemes encode a relatively small amount of information and such information (or a subset of such information) may be converted into watermark signals using the method outlined in FIG. 1.

For more information on bar codes, see D. J. Collins, N. N. Whipple, Using Bar Code-Why It's Taking Over, (2d ed.) Data Capture Institute; R. C. Palmer, The Bar Code Book, ($3^{rd}$ ed.) Helmers Publishing, Inc., and P. L. Grieco, M. W. Gozzo, C. J. Long, Behind Bars, Bar Coding Principles and Applications, PT Publications Inc., which are hereby incorporated by reference.

Applications

Interrelating Digital Watermarks and Barcodes

Digital watermarks can be used in connection with traditional barcodes. For example, a digital watermark can include information to verify, decrypt or decode the barcode, or vice versa. In one implementation, a digital watermark includes a payload carrying information related to the barcode. For instance, the digital watermark may include a hash of the barcode information or of a subset of the barcode information. In another implementation, the digital watermark includes a key to decrypt or decode the barcode. Or the digital watermark payload and the barcode information interrelate (e.g., match or mathematically coincide.).

Identification Cards

Now consider an identification card. An identification card can include a driver's license, passport, company identification, identification document, membership card, national identification card, insurance card, etc., etc., etc. The identification card includes a barcode, e.g., carrying at least variable information such as a cardholder's name, address, card number, and optionally, a photograph information, biometric information, etc., etc. The barcode can be printed on either side of the identification card. Most frequently, however, the barcode is positioned on a backside of the card. The identification card will typically include a photograph and printed information to identify the cardholder. The card can also include so-called fixed information. (For example, fixed information on a driver's license may identify the State, DMV information, or other information that is not personal with respect to the card's holder.).

The identification card includes a digital watermark embedded therein. The digital watermark includes a payload or other information bits. While the digital watermark can be embedded variously throughout the card (e.g., in printed areas, background texture, photograph, etc.), embedding preferably occurs in at least the photograph.

In a first implementation, the watermark payload includes a hash of the information carried by the barcode. Most generally, a hash includes the result of an algorithm that converts data into a lower number of bits. Examples of hashing algorithms include MD5, MD2, SHA, and SHA1, among others. A hash can also include a subset of the barcode's information set. For instance, the barcode may include a cardholder's photograph, birth date, name and card number. A subset hash may then include a subset of this information, e.g., only the birth date and card number.

The interrelationship between the barcode and digital watermark are used to verify the authenticity of the identification card. One verification implementation is described with reference to FIG. 3. A digital watermark is detected and decoded (step 10). The digital watermark includes a payload having verification information, such as a hash as discussed above. And the barcode is read and decoded in step 12. We note that the order of steps 10 and 12 is not critical, unless either the digital watermark or the barcode includes a key to decode or decrypt the other. The digital watermark data is compared with the barcode information (step 14). The comparison may include recalculating a hash of the barcode information and comparing the recalculated hash against a hash carried by the digital watermark. Or if the digital watermark hash includes a subset of the barcode information, the subset is compared against the barcode information set. (For example, the subset hash may include the cardholder's birth date and card number. This information is compared against the barcode birth date and card number.). Or if the digital watermark payload includes a key for decoding/decrypting the barcode, the comparison step may include determining whether the barcode can be successfully decoded/decrypted, or vice versa. In still another case, the digital watermark includes the full set of barcode information, and not just a subset of such information. Still further a comparison may determine whether the watermark information coincides with the barcode information.

The result of the comparison step 14 is used to determine whether this digital watermark and barcode information match or otherwise coincide (step 16). The term "match" is defined broadly herein to include an exact match and a predetermined relationship, such as a cryptographic relationship, overlap of data sets or other predetermined relationship. The process preferably provides an indication of whether the card is authentic (18) or not (20).

This authentication method is helpful in preventing counterfeiters or forgers. For example, suppose an identification card is embedded with a first digital watermark. The identification card belongs to say 16-year old Joan. The identification card further includes Joan's photograph and a barcode including at least Joan's variable information (name, sex, age, etc.). The first digital watermark includes a hash or other information that corresponds in some manner to Joan's barcode information. Joan decides that she wants to "upgrade" her age, by cutting and pasting her identification card photograph onto her 22-year old sister, Molly's, identification card. Molly's identification card also includes a barcode with her variable information.

Joan pulls off a professional job replacing Molly's photo with her own. All seems fine for Joan until the verification process of FIG. 2 is used to verify the identification card. Joan's first digital watermark hash (included in Joan's photograph) does not match Molly's barcode information—confirming that the photograph does not belong to the identification card. The counterfeit is justly determined.

A similar verification process can be carried out for watermarks embedded in regions other than a photograph.

Figure 4:
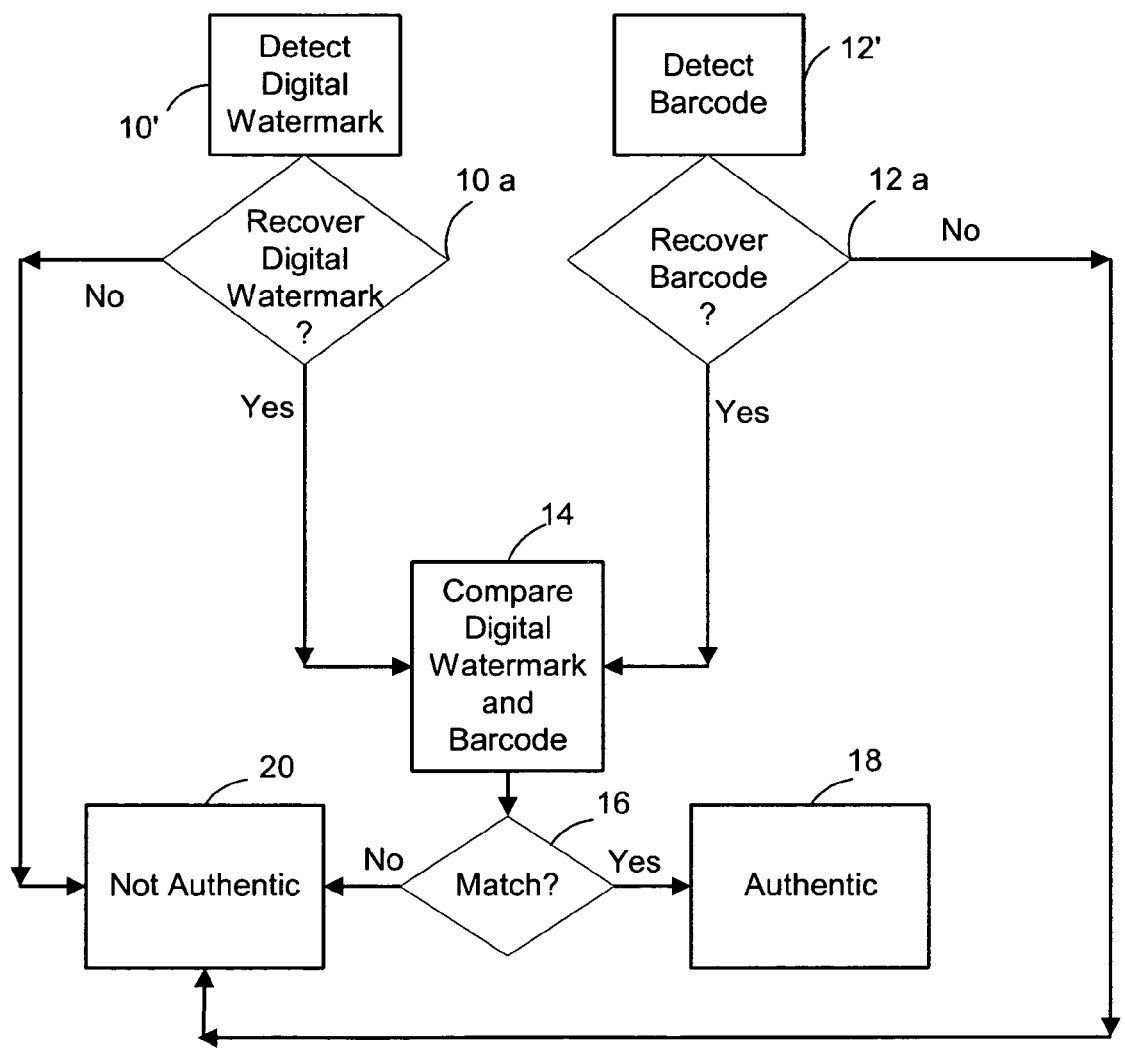
FIG. 4 is a flow diagram illustrating an alternative implementation of an authentication process.

In some counterfeiting scenarios, a photograph without a digital watermark is used to replace an original, digitally watermarked photograph. To handle this case, the authentication method of FIG. 3 may be modified to include steps 10' and 10a to determine whether the digital watermark is recovered or successfully read, e.g., prior to step 14. If the digital watermark is not recovered the document is considered fraudulent or at least not valid. Similar steps 12' and 12b are optionally implemented to determine whether the barcode is decoded. Our alternative implementation is shown in FIG. 4.

Figure 5:
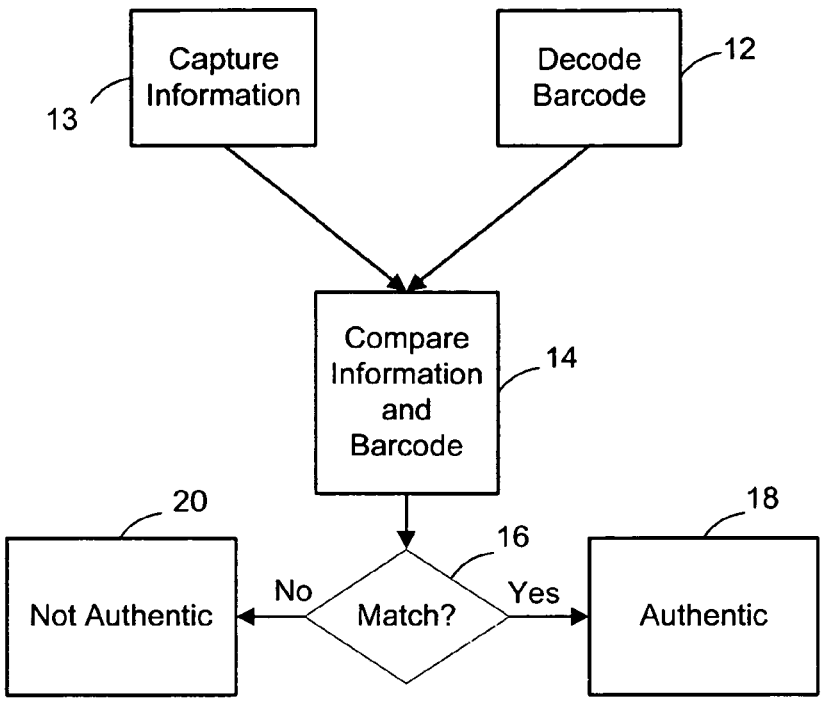
FIG. 5 is a flow diagram illustrating a barcode authentication process.

Another alternative implementation is shown in FIG. 5. In this implementation, we compare barcode information against information printed on or otherwise contained in or on the identification card. The barcode is decoded (step 12). As discussed above with respect to FIG. 4, step 12a (not shown in FIG. 5) is optionally provided to ensure that the barcode is successfully recovered. Information contained on or in the identification card is captured through, e.g., optical character recognition (OCR), manual input, magnetic stripe, data retrieved from electronic circuitry in the identification card (if provided), etc. (step 13). The captured information is compared with the barcode information (step 14). The result of the comparison step 14 is used to determine whether the captured text and barcode information match or otherwise coincide (step 16). The process preferably provides an indication of whether the card is authentic (18) or not (20). This implementation helps detect a situation where Joan decides to also "cut-and-paste" her barcode onto Molly's ID card. Of course, this method can be combined with those shown in FIGS. 3 and 4. For example, the method illustrated in FIG. 5 can be carried out between steps 12 and 14 in FIG. 3 and/or between steps 12a and 14 in FIG. 4.

Figure 6:
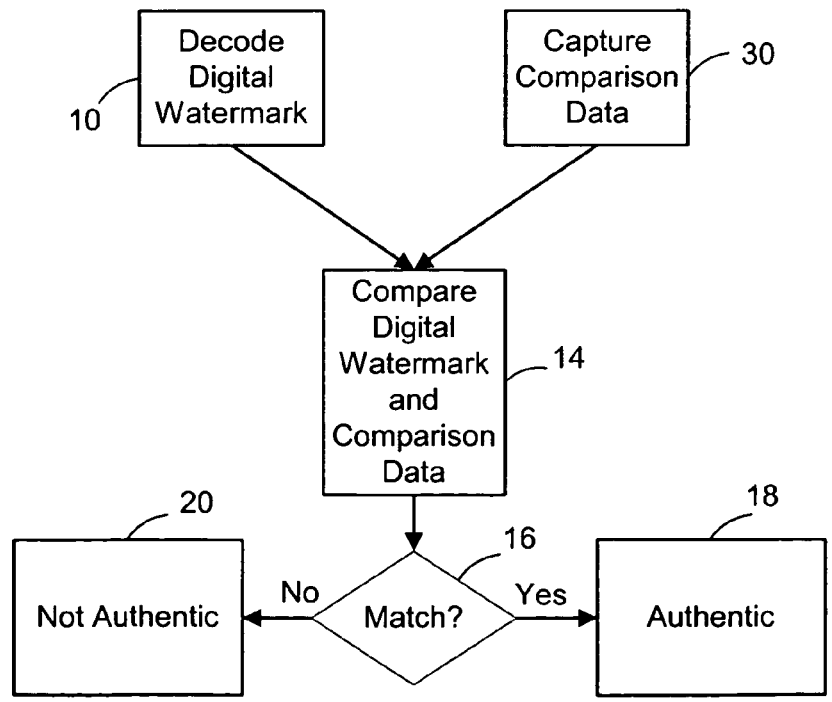
FIG. 6 is a flow diagram illustrating an authentication process that compares digital watermark information with another machine-readable code.

In another implementation shown in FIG. 6, comparison data is alternatively captured instead of retrieving the comparison data from a barcode (step 30). For example, the comparison data is gathered via optical character recognition (OCR), a magnetic stripe, magnetic ink character recognition (MICR), optical mark recognition (OMR), manual input, or in a case where the identification card includes so-called Smartcard or RFID circuitry, from electronically stored data. The FIG. 6 implementation otherwise proceeds as discussed above with respect to FIG. 3. (We note that the FIG. 6 implementation can be modified to include the optional steps 10' and 10a as discussed with respect to FIG. 4.).

Watermark Reading Devices

There are many suitable computing devices that can be used with the present invention. One is a general-purpose computer including standard processing structure, an image capture device (e.g., a digital camera, optical sensor, etc.) and memory. The memory includes digital watermark detecting software instructions stored therein for execution on the processing structure (e.g., a CPU). The image capture device can be tethered to the computer or can wirelessly communicate with the computer.

We have also found that conventional 2-D barcode readers can be modified to achieve digital watermark detection. Such barcode readers generally include an imaging sensor such as a CMOS sensor or a CCD array. One such suitable imaging sensor is the OmniVision Technologies barcode camera. OmniVision is headquartered in Sunnyvale, Calif., 94085, USA. See www.ovt.com for even more information. Another suitable barcode reader is the Welch Allyn Dolphin product, which includes Intel's StrongArm processor and runs Windows CE. Symbol Technologies, Inc., which is headquartered in Holtsville, N.Y., USA, develops other suitable barcode readers. Examples of such include Symbol's VS4000 and P300IMG models. These readers include a progressive scan CCD with an optical resolution of about 640×480 pixels×256 shades of gray. (Even more information about Symbol's readers can be obtained from Symbol Technologies or at www.symbol.com/products/barcode_scanners).

Of course, there are many other known barcode readers that can be suitably interchanged with the present invention. We also anticipate that barcode readers will continue to improve and advance. Such improvements are anticipated to be suitably interchangeable with the present invention.

A 2-D barcode reader is programmed with digital watermark detecting software. The 2-D barcode reader captures an image of a document or object that is embedded with a digital watermark. The digital watermark detecting software analyzes the captured image to decode the digital watermark. (We note that such digital watermark detecting software is readily implemented in view of this and the incorporated by reference patent documents.).

A 2-D barcode/digital watermark reader is an advantageously solution since it can read and decode both 2-D barcodes and digital watermarks. A 2-D barcode reader can even be programmed to carry out the authentication method of FIG. 3 and other document verification methods.

Such a 2-D barcode is also capable of capturing relatively high quality images. This advantageous feature can be combined with our digital watermarking techniques. For example, a 2-D bar code reader captures an image of a cardholder's face. Facial recognition software processes the image to generate a hash. The same 2-D barcode reader is used to decode the digital watermark and/or barcode. The digital watermark (and/or barcode) includes a related facial recognition hash. If the hashes match or otherwise coincides the individual and identification document are authenticated. Or the 2-D barcode reader can be configured to image a fingerprint to determine authenticity.

It should be appreciated that while we have referenced "2-D barcode readers" the present invention is not limited to such. Indeed, as mentioned above, a general purpose computer communicating with an imaging device can be used to achieve similar functionality.

Watermarking Identification Card Stock

Another inventive aspect of our present invention is to pre-digitally watermark identification card stock. For example, before being personalized, identification card stock is digitally watermarked. The watermark may be embedded in background print or texturing for example, or in printed fixed information.

To verify authenticity, an identification card must include the pre-embedded digital watermark. This watermark need not include a unique identifier, but rather can include the same identifier per card batch, run or for all cards. (If a batch of cards is misappropriated, cards having that batch watermark identifier can be flagged as suspect.).

The digital watermark may even include a so-called fragile watermark. A fragile watermark is designed to destruct or predictably degrade upon signal processing such as scanning and printing. A fragile watermark will help prevent unauthorized copying of the card stock. (Fragile digital watermarking technology and various applications of such are even further disclosed, e.g., in assignee's U.S. patent application Ser. Nos. 09/234,780, 09/433,104 (now U.S. Pat. No. 6,636,615), Ser. No. 09/498,223 (now U.S. Pat. No. 6,574,350), Ser. Nos. 60/198,138, 09/562,516, 09/567,405, 09/625,577 (now U.S. Pat. No. 6,788,800), Ser. No. 09/630,243 (now U.S. Pat. No. 6,735,324), Ser. No. 09/645,779 (now U.S. Pat. No. 6,714,683), Ser. No. 09/689,226 (now U.S. Pat. No. 6,694,041), Ser. Nos. 09/689,289, 09/689,293 (now U.S. Pat. No. 6,683,966), Ser. Nos. 60/232,163, 60/247,389, and 09/898,901 (now U.S. Pat. No. 6,721,440). Each of these applications is herein incorporated by reference.).

Linking Documents through Digital Watermarking

Documents can be linked together, and to a bearer/creator through secure indicia on a photo ID and subsequently issued documents.

Consider the following inventive combination of steps:

1. Decode a digital watermark identifier embedded within a photo ID presented by a bearer of the photo ID;

2. Embed that watermark identifier or a cryptographic permutation of the identifier into a first document issued to the bearer (e.g., a boarding pass, ticket, etc.); and 3. Now, the photo ID and first document are linked through the two digital watermark identifiers. This enables an additional layer of verification when the bearer presents the photo ID and first document to gain access, get on a plane, etc. etc. In particular, the bearer has to present the photo ID and first document, AND the watermarks extracted from the photo ID and first document must match or otherwise satisfy a predetermined relationship, like a cryptographic function.

The two watermarks can be related in many ways. Preferably, the watermarks are readable by the same detector to simplify deployment. But to prevent someone from merely copying the watermark from the ID to some fake document, it is useful to alter the watermark in some way that maintains the relationship between the two documents but does not yield the same watermark.

This concept applies to other forms of printable secure indicia, like some types of bar codes and scrambled indicia. We can even extend this to other machine-readable codes, but these codes should be readable from the photo ID and then be writable to the document that is issued. Some examples may include magnetic strip readers and writers, smart cards, etc.

Our inventive system for linking documents in a secure fashion also provides a solution for home printing of say tickets and boarding passes (e.g., a user presents her photo ID at home, the digital watermark identifier is extracted from the photo ID and is printed on tickets, the embedded ticket is then verified at the airport gate).

Orientation Signals versus Object or Area Detection In some digital watermarking techniques, the components of the watermark structure may perform the same or different functions. For example, one component may carry a message, while another component may serve to identify the location or orientation of the watermark in a combined signal. This orientation component is helpful in resolving signal distortion issues such as rotation, scale and translation. (Further reference to orientation signals can be made, e.g., to assignee's U.S. patent application No. 09/503,881, now U.S. Pat. No. 6,614,914, which is herein incorporated by reference.).

We have found that we can forego an orientation signal when embedding a digital watermark message component in an identification card photograph, since most identification cards, e.g., a driver's license, include a standard rectangular-shaped photograph. We use object detection techniques to locate the photograph shape, determine distortion based on the expected shape of the photograph area, adjust the photograph area to compensate for the determined distortion and then detect the digital watermark from the reshaped (or adjusted) photograph area. We can include even more message bits without significantly effecting visibility when we forego an orientation signal.

Once the photograph is realigned we can successfully detect and decode a digital watermark embedded therein. The watermark can be used for authentication purposes as discussed above.

Perceptual Hashes and Facial Recognition

Another inventive implementation compares a perceptual hash (or facial recognition data) of a photograph in an identification document with a similarly computed hash (or data) carried by either a barcode or digital watermark. In a detection process, we can use a digital watermark orientation signal or the object recognition techniques discussed above to help realign a distorted captured image of the photograph. A perceptual hash (or facial recognition analysis) is determined from the realigned photograph. The determined perceptual hash is compared with a stored hash recovered from a digital watermark or barcode.

Concluding Remarks

Having described and illustrated the principles of the invention with reference to specific implementations, it will be recognized that the principles thereof can be implemented in many other, different, forms. To provide a comprehensive disclosure without unduly lengthening the specification, applicants incorporate by reference the patents and patent applications referenced above.

While the above implementations have focused on authenticating identification documents, it should be understood that the present invention is not so limited. Indeed, digital watermark information can be compared with information carried by other machine readable codes to authenticate or compliment product packaging, product labels, product hang tags, receipts, inventory, sale documentation, medical records, credit cards, paper files, software, DVDs, CDs, products, etc., etc., and any other document or object including a machine readable code and digital watermark.

The particular combinations of elements and features in the above-detailed embodiments are exemplary only; the interchanging and substitution of these teachings with other teachings in this and the incorporated-by-reference patents/applications are expressly contemplated.

What is claimed is:

1. An authentication method comprising:
   receiving optical scan data corresponding to a human face;
   processing the scan data corresponding to the human face with a facial recognition module to generate a first hash;
   receiving optical scan data corresponding to an identification document including steganographic indicia, wherein the steganographic indicia is provided on the identification document through altered values of graphics, art or imagery carried by the identification document, the altered values are generally imperceptible to a human observer of the identification document, and wherein the steganographic indicia includes a second hash corresponding to a facial recognition of the human face; and comparing the first hash with the second hash to determine whether the first hash and the second hash coincide in an expected manner.

2. The method of claim 1, wherein the steganographic indicia comprises digital watermarking.

3. The method of claim 1, wherein the digital watermarking comprises an orientation component that is helpful to resolve image distortion.

4. A method to authenticate an identification document, wherein the identification document comprises a photographic representation of an authorized bearer of the identification document, and wherein said identification document further comprises a digital watermark including first plural-bit auxiliary data, said method comprising:

receiving optical scan data representing at least a portion of the photographic representation;

determining a reduced-bit representation of the portion of the photographic representation front the received optical scan data;

recovering the first plural-bit auxiliary data of the digital watermark from the received optical scan data, wherein the digital watermark is provided on the identification document through altered values of graphics art or imagery carried by the identification document, the altered values art generally imperceptible to a human observer of the identification document; and comparing the reduced-bit representation of the portion of the photographic representation with the first auxiliary data to authenticate the identification document.

5. The method of claim 4, wherein the first auxiliary data corresponds to a reduced-bit representation of at least the portion of the photographic representation.

6. The method of claim 4, wherein the reduced-bit representation comprises facial recognition data.

7. The method of claim 4, wherein the reduced-bit representation comprises a hash.

8. The method of claim 4, wherein said digital watermark comprises an orientation component.

9. The method of claim 8, further comprising adjusting the received optical scan data to adjust for image distortion relative to the orientation component.

10. The method of claim 9, wherein said determining a reduced-bit representation is executed after said adjusting step.

11. A computer readable medium having software instructions stored thereon, said instructions causing a computer to perform the method of claim 10.

12. A computer readable medium having software instructions stored thereon, said instructions causing a computer to perform the method of claim 4.

13. The method of claim 4 wherein the digital watermark is embedded in the photographic representation of the authorized bearer of the identification document.

14. The method of claim 13 wherein the digital watermark further comprises second plural-bit auxiliary data including data representing information provided elsewhere on the identification document.

15. A method to authenticate an identification document, wherein the identification document comprises a photographic representation of an authorized bearer of the identification document, and wherein said identification document further comprises steganographic indicia including first facial recognition data that corresponds with a human face depicted in the photographic representation, wherein said steganographic indicia is embedded in the photographic representation of the authorized bearer of the identification document through altered values representing the photographic representation, the altered values are generally imperceptible to a human observer of the identification document, said method comprising:

receiving optical scan data representing at least a portion of the photographic representation;

generating second facial recognition data corresponding to the portion of the photographic representation from the received optical scan data;

recovering the first facial recognition data included in the steganographic indicia that is embedded in the photographic representation of the authorized bearer of the identification document from the received optical scan data; and comparing the recovered first facial recognition data with the second facial recognition data to determine whether the document is authentic.

16. The method of claim 15, wherein the steganographic indicia comprises digital watermarking.

17. The method of claim 16 wherein said digital watermarking comprises an orientation component.

18. The method of claim 17, further comprising adjusting the received optical scan data relative to the orientation component.

19. The method of claim 18, wherein said generating second facial recognition data is performed after said adjusting step.

20. A computer readable medium having software instructions stored thereon, said instructions causing a computer to perform the method of claim 19.

21. A computer readable medium having software instructions stored thereon, said instructions causing a computer to perform the method of claim 15.

* * * * *